United States Patent [19]

Ganguli et al.

[11] Patent Number: 5,275,997
[45] Date of Patent: * Jan. 4, 1994

[54] PRECIOUS METAL CATALYSTS UTILIZING COMPOSITES OF OXYGEN-ION CONDUCTING AND INERT SUPPORT MATERIALS

[75] Inventors: Partha S. Ganguli, Princeton; Sankaran Sundaresan, Mercerville, both of N.J.

[73] Assignee: PCP Consulting and Research, Inc., Princeton, N.J.

[*] Notice: The portion of the term of this patent subsequent to Aug. 3, 2010 has been disclaimed.

[21] Appl. No.: 876,872

[22] Filed: Apr. 30, 1992

Related U.S. Application Data

[63] Continuation-in-part of Ser. No. 592,793, Oct. 4, 1990, abandoned, which is a continuation-in-part of Ser. No. 459,560, Jan. 2, 1990, Pat. No. 5,232,890.

[51] Int. Cl.$^5$ .................... B01J 23/42; B01J 23/44
[52] U.S. Cl. .................... 502/304; 502/332; 502/333; 502/334; 502/335; 502/439
[58] Field of Search ............. 502/349, 350, 335, 351, 502/340, 302, 334, 332, 333, 304

[56] References Cited

U.S. PATENT DOCUMENTS

| | | | |
|---|---|---|---|
| 4,537,873 | 8/1985 | Kato et al. | 502/339 |
| 4,631,267 | 12/1986 | Lachman et al. | 502/527 |
| 4,791,079 | 12/1988 | Hazbun | 502/324 |
| 4,827,071 | 5/1989 | Hazbun | 585/443 |
| 4,849,392 | 7/1989 | Hums et al. | 502/345 |
| 4,906,176 | 3/1990 | Yamashita et al. | 502/439 |
| 5,010,052 | 4/1991 | Quemere | 502/304 |
| 5,232,890 | 8/1993 | Ganguli et al. | 502/304 |

*Primary Examiner*—Anthony McFarlane
*Attorney, Agent, or Firm*—Fred A. Wilson

[57] ABSTRACT

Three-way precious metal catalysts useful for conversion treatment of pollutants in fuel combustion gases from automotive exhausts, or gas emissions from stationary fuel combustion sources, have chemical activity and thermal stability of the catalysts appreciably enhanced by utilizing a composite oxygen-ion conducting support material. Such composite supports are composed of zirconia stabilized by yttria, calcia, magnesia or scandia, and at least 40 wt. % inert support material such as alumina or titania, and have surface area of 20–300 m$^2$/gm. The catalysts can be supported by composites of yttria-stabilized-zirconia (YSZ) and alumina, and contain 0.01–3.0 wt % total active metals, which may consist of major metals platinum or palladium and minor metals rhodium or ruthenium dispersed on the support. Such three-way catalysts are thermally stable, achieve a high level of pollutants (CO, NO$_x$, H$_2$ and hydrocarbons) removal, and have long catalyst life without requiring undesirably high loading of expensive precious active metals on the catalyst support material.

19 Claims, No Drawings

PRECIOUS METAL CATALYSTS UTILIZING COMPOSITES OF OXYGEN-ION CONDUCTING AND INERT SUPPORT MATERIALS

CROSS REFERENCE TO RELATED APPLICATIONS

This is a continuation-in-part application of Ser. No. 07/592,793 filed Oct. 4, 1990, now abandoned, which was a continuation-in-part of Ser. No. 07/459,560, filed Jan. 2, 1990, now U.S. Pat. No. 5,232,890.

BACKGROUND OF INVENTION

This invention pertains to improved three-way precious metal catalysts which utilize a composite oxygen-ion conducting support material and provide treatment for gas emissions or pollutants from fuel combustion sources. It pertains particularly to such catalysts in which the oxygen-ion conducting support material is provided by a composite of an oxygen-ion conducting material and an inert support material on which at least two chemically active metals are dispersed, for simultaneous oxidation of CO, $H_2$ and hydrocarbon compounds and reduction of nitrogen oxides present in fuel combustion gases. The oxygen-ion conducting support material can be zirconia stabilized by yttria, calcia, magnesia, or scandia and the inert material can be alumina or titania, so as to provide improved thermal stability and increased surface area and activity for the catalyst.

Supported metal catalysts are widely used for oxidation and reduction of pollutants present in exhaust gas emissions from mobile or stationary combustion power generation sources, such as automotive exhaust gases or power plant stack gas emissions. One approach to solving this gas emission pollutant problem by simultaneous oxidation of carbon monoxide and hydrocarbons and reduction of $NO_x$ compounds in exhaust gases is passing such gases through a single bed catalytic converter. Three-way catalysts used in such catalytic converters typically consist of platinum (Pt), rhodium (Rh) and sometimes palladium (Pd) deposited on a conventional γ-alumina ($Al_2O_3$) support material, which may be in either pellet or a monolithic form.

The existing precious metal catalysts used for treatment of automotive exhaust gas emissions typically use γ-alumina and sometimes ceria-stabilized and/or lanthanum-oxide-stabilized γ-alumina as a support material. The addition of ceria may promote the performance of the catalyst by facilitating a water-gas shift reaction, by acting as an oxygen storage unit, and by stabilizing the gamma-alumina support against loss of surface area at high temperatures. Also, known catalyst support materials used in catalysts for automotive exhaust gas emissions treatment can advantageously have an oxygen-ion conducting property, as was disclosed in our co-pending patent application Ser. No. 07/459,560, which is incorporated herein by reference. We have observed that such catalysts having yttria-stabilized-zirconia (YSZ) supports used alone provide desired thermal stability and moderate useful active life for the catalyst. However, to provide catalysts having an improved substrate or support material particularly for use in automotive catalytic converters requiring long active useful life, the support material must have high thermal stability and surface area exceeding about 20 $m^2/gm$ after extended thermal aging or service use, because in automotive service the catalysts can be subjected to prolonged temperatures as high as 1000° C.

We have now discovered that improved stable catalysts utilizing an oxygen-ion conducting catalyst support material can be advantageously made using a composite of an oxygen-ion conducting material and an inert support material, such as composites of yttria-stabilized-zirconia (YSZ) and at least 40 wt. % inert support material such as alumina or titania. Such composite support materials provide for improved precious metal catalysts having enhanced pollutant removal capability and high thermal stability, without the need for using high percentages of the oxygen-ion conducting support material or active precious metals content of the catalyst. These three-way composite catalysts utilizing e.g. Pt/Rh active metals on YSZ-$Al_2O_3$ support material are significantly superior to catalysts using Pt/Rh active metals deposited on conventional supports such as -alumina stabilized with cerium oxide or lanthanum oxide, and provide improved thermal stability and longer catalyst life.

SUMMARY OF INVENTION

The present invention provides improved stable three-way precious metal catalysts utilizing a composite of an oxygen-ion conducting support material and an inert support material, and having small amounts of at least two chemically active precious metals dispersed on the support. Such composite support materials are an intimate molecular mixture of the oxygen-ion conducting component and the inert material component, so that such composites are basically different from an oxygen-ion material being merely coated onto an inert support material. These catalysts provide effective removal of pollutants present in fuel combustion gas emissions from mobile and stationary sources, such as from automotive engine exhaust gases.

The catalyst composite support material having oxygen-ion conducting properties has surface area at least about 20 $m^2/gm$ after extensive aging in air at 1000° C. for four hours. The oxygen-ion conducting support material can be zirconia (ZrOz) stabilized by adding appropriate amounts of yttria, calcia, magnesia or scandia or mixtures thereof, and the inert support material is at least about 40 wt. % of a conventional catalyst support material such as alumina or titania. The active precious metals added to the catalyst composite support material include at least one major active metal and at least one minor active metal. Useful major active metals are platinum (Pt), palladium (Pd), or a combination thereof; useful minor active metals are rhodium (Rh), ruthenium (Ru), or a combination thereof. The total active major and minor metals content should be in the range of 0.01–3.0 wt. percent. The weight ratio of the active minor metal to the active major metal should be in the range of 0.01–0.5.

The catalyst support material is usually formed by a composite of 5–60 wt. % yttria-stabilized-zirconia (YSZ) and 40–95 wt. % gamma alumina. The two active metals are usually platinum (Pt) and rhodium (Rh), which are provided on the catalyst composite support in a total active metals concentration of 0.01 to 3.0 wt. percent of the catalyst, and in a weight ratio for the rhodium/platinum in the range between 0.01/1 and 0.05/1.

The fundamental concept for our invention is that when oxygen-ion conducting materials are used as supports for precious metals catalysts, a new class of chemical reactions are triggered at the three-phase interface between the precious metal crystallites, gas phase and the support material, and that these reactions can appreciably augment the usual rates of the desired chemical reactions. Because of using the oxygen-ion conducting composite as supports, the resulting catalysts have high stability and long useful life, as well as enhanced activity towards pollutants removal from fuel combustion gases.

DESCRIPTION OF INVENTION

The three-way precious metals catalysts provided by this invention may preferably contain an oxygen-ion conducting composite support material which is formed by 5-60 wt. % yttria-stabilized-zirconia (YSZ) and 40-95 wt. % gamma alumina and an active major metal including either platinum or palladium combined with an active minor metal including either rhodium or ruthenium dispersed on the support material. If desired, cerium oxide or lanthanum oxide up to 20 wt. % of the support material can be added as an additional thermal stabilizer. The composite support material has a surface area after thermal aging in air at 1000° C. for four hours of at least about 20 $m^2/gm$, and preferably has 40-300 $m^2/gm$ surface area. The amount of zirconia ($ZrO_2$) utilized in the composite support material is 4.5-45 wt. %, and is preferably 8-40 wt. %; the concentration of yttria ($Y_2O_3$) used in the composite support material should be 0.5-15 wt. %, and is preferably 2-10 wt. %. The concentration of the yttria-stabilized zirconia (YSZ) on the YSZ-$Al_2O_3$ composite support material should be 5-60 wt. %, and is preferably 10-50 wt. % of the support. The concentration of alumina ($Al_2O_3$) in the composite support should be in the range of 40-95 wt. %, and is preferably 50-90 wt. % of the support. The total active metal concentrations of either platinum or palladium combined with either rhodium or ruthenium dispersed on the support material should be within the range of 0.01 to 3.0 wt. % of the catalyst, and is preferably 0.05-2.5 wt. %. The weight ratio of rhodium/platinum (Rh/Pt) or rhodium/palladium (Rh/Pd) may vary from 0.01/1 to 0.5/1, and is preferably in the range of 0.02/1 to 0.4/1.

The active metals platinum, palladium, rhodium and ruthenium can be deposited on the composite support material by using a known aqueous solution impregnation procedure. Useful shapes for the catalyst can include beads, extrudates, pellets, and monolithic molded shapes, such as honeycomb structures.

High surface area composite support material of yttria-stabilized-zirconia and γ-alumina can be prepared either by a sol-gel technique using alkoxides of the elements, or by a microemulsion technique using aqueous solutions of yttrium, zirconium, aluminum and ammonium salts which are described below.

Because of utilizing a composite of an oxygen-ion conducting material and an inert material as support for improved three-way precious metal catalysts according to this invention, the resulting catalyst is much more thermally stable and active towards simultaneous oxidation of CO, $H_2$ and hydrocarbons, and reduction of $NO_x$ than known catalysts having supports of conventional support materials, such as ceria and lanthanum oxide stabilized alumina alone. This new more stable catalyst advantageously achieves a substantially higher level of pollutants removal from fuel combustion gases such as from automotive exhaust gases, or from stationary combustion sources, without requiring an undesirable increase in the concentration or loading of precious active metals on the catalyst support material. Because of good thermal stability and high surface area for the composite support of oxygen-ion conducting material and inert material, superior catalytic activity can be maintained for longer useful life than for catalysts using YSZ support alone.

This new improved catalyst is advantageous for removal of known pollutants from exhaust gases from various fuel combustion processes, such as gas emissions and pollutants from internal combustion engines, including gasoline and diesel automotive engines and gas turbines. Such gas pollutants also occur from stationary fuel combustion in power plants and from waste material incineration installations, and catalytic combustion of chemical effluents. Catalytic action using this catalyst on fuel combustion exhaust gases results in converting pollutant compounds to essentially non-polluting $CO_2$, $N_2$ and water vapor.

Catalyst Substrate Preparation Methods: This invention also includes a method for preparation of $Y_2O_3$-stabilized —$ZrO_2$—$Al_2O_3$ composite powders by a sol-gel technique or a microemulsion procedure. For the sol-gel technique, zirconium-butoxide-butanol liquid and solutions of aluminum isopropoxide and yttrium isopropoxide in toluene are mixed thoroughly by a stirrer in excess anhydrous alcohol such as anhydrous ethanol at room temperature (20° F.) for 1-3 hours. The concentration of salts in the resulting solution should be ≦5 wt. %. The solution is heated to 30°-100° C. and preferably to about 40° C., while a flow of water-saturated air is maintained above the stirred solution to supply reactant water for hydrolysis reactions to form composite particles in suspension. Water can be added at a very low rate by some other means. After 10-24 hours, small amounts of deionized water is added to the stirred solution periodically e.g. every three hours to maintain a low concentration of water to complete hydrolysis reactions. After a total run of 30 to 60 hours, the operation is stopped, the slurry is evaporated at moderate temperature, and the resulting powder is dried at 150°-200° C. for 1-3 hours. The dried powder is then calcined in air at 500° C. for 1-4 hours and at 950° C. for 1-3 hours. The resulting yttria-zirconia-alumina composite powders have composition of 0.5-15 wt. % $Y_2O_3$, 4.5-45 wt. % $ZrO_2$, and 40-95 wt. % $Al_2O_3$, and have high surface area exceeding 40 $m^2/gm$ and usually 100-600 $m^2/gm$, and have uniform composition and sufficient thermal stability for an effective catalyst material.

Alternatively, the composite support material powder can be prepared by using a microemulsion procedure, for producing high surface area yttria-stabilized-zirconia-alumina composite catalyst support. In this procedure, appropriate amounts of yttrium chloride, zirconium oxychloride and aluminum chloride are dissolved in distilled water to yield 10 to 20 wt. % salt in solution. Next, xylene and a surfactant such as Triton x-100 is mixed with this aqueous solution by stirring until clear, so that the salt solution:xylene:surfactant in the weight ratio of 1:2:2 form a microemulsion. Then, 3 mole percent ammonium hydroxide solution, xylene and the surfactant are mixed by stirring until clear, so that the ammonium hydroxide:xylene:surfactant in the weight ratio of 1:3.5:3.5 form a microemulsion.

The salt microemulsion is mixed by stirring with basic microemulsion in weight ratio of about 2:1, in order to form very fine precipitates of composites of $Y_2O_3$—$ZrO_2$—$Al_2O_3$. The mixed slurry is distilled to remove xylene and water, so that the product settles as a precipitate to the bottom of the vessel, with the surfactant on top. The surfactant is separated from the precipitate. The precipitate is vacuum filtered and washed with xylene and water. The resulting composite powder is dried at 100°-200° C. temperature for 2 to 4 hours, and then calcined at 500° C.-1000° C. for 1-4 hours to produce a composite support material having high thermal stability and surface area of at least 20 m²/gm.

This composite powder support material prepared by either the sol-gel or the microemulsion method is then impregnated with at least two active precious metals including a major metal platinum or palladium and a minor metal rhodium or ruthenium, to produce a three-way catalyst utilizing a composite oxygen-ion conducting support material.

This invention will be further described by the following Examples, which should not be construed as limiting in scope.

EXAMPLE 1

Tests were made to determine thermal stability of the composite YSZ-$Al_2O_3$ support powders. The composite powders were artificially aged by thermal treatment in air at 1000° C. for four hours to mimic automotive service for 50,000 miles, and the surface area of the treated powders were measured. The aged treated powders had high surface areas exceeding 40 m²/gm and usually up to 200 m²/gm and prove the enhanced thermal stability of the catalyst support structure.

Accelerated thermal aging at 1000° C. in air for 8-12 hours (to mimic automotive service for 100,000 miles or more) is used as a standard test by manufacturers of three-way catalysts to mimic the conditions encountered by catalysts in actual automotive exhaust gas use over a life of about 100,000 miles or more. A commercially available yttria-stabilized-zirconia (YSZ) support containing 8-12 wt. % yttria on zirconia after thermally aging at 1000° C. in air for 12 hours, has a surface area of 12 m²/gm, which area is considered too low for an effective automotive exhaust catalyst. A YSZ support material, prepared by our sol-gel or micro-emulsion techniques, after thermal aging at 1000° C. in air for 12 hours, also provided low surface area of about 12.2 m²/gm. But when we prepare a YSZ-$Al_2O_3$ composite support powder by using either our sol-gel or micro-emulsion technique, our lab results showed the surface area after thermal aging (at 1000° C., in air for 12 hours) were in the range of 60-100 m²/gm, provided that the percent $Al_2O_3$ in the YSZ-$Al_2O_3$ composite is at least 40 wt. %. These results show that catalysts utilizing composite supports prepared according to this invention have substantially increased surface area even after similar thermal aging, thus indicating significantly improved thermal stability and useful life for the catalyst.

EXAMPLE 2

Composite $Y_2O_3$—$ZrO_2$—$Al_2O_3$ support powders of different compositions were prepared by using a sol-gel technique. Samples of these composite powders were thermally treated at 1000° C. for four hours in air to simulate artificial aging treatment after 50,000 mile use in an automobile exhaust. Composition and surface areas for these powders are presented in the following Table 1.

TABLE 1

| Composite Support | Surface Area of Treated Powder, m²/gm |
| --- | --- |
| YSZ-75 mole % $Al_2O_3$ | 183 |
| YSZ-45 mole % $Al_2O_3$ | 110 |
| YSZ-25 mole % $Al_2O_3$ | 43.5 |

It is noted that after the thermal aging treatment made to simulate extended automotive exhaust gas usage, surface areas of these composite powders containing YSZ and 45-75 mole % $Al_2O_3$ were 110-183 m²/gm, which is great enough to provide effective and stable catalysts.

EXAMPLE 3

A catalyst performance comparison was made between a commercially available automotive exhaust catalyst and a sample catalyst made in accordance with this invention. The commercial catalyst (Toyota Camry, 1989) designated WGIT was 1 inch diameter×1 inch length Cordierite monolith coated with 30 wt. % alumina powder impregnated with 0.85 wt. % Pt and 0.25 wt. % Rh active metals, and thermally aged at 1000° C. for four hours in air. The catalyst having a composite support made according to this invention and designated CM4T was 1 inch diameter×1 inch long Cordierite monolith coated with 30 wt. % composite powder containing YSZ-$Al_2O_3$ impregnated with 0.85 wt. % Pt and 0.25 wt. % Rh active metals, and thermally aged at 1000° C. in air for four hours. The feed gas used was a simulated automotive exhaust gas containing 2.0V % CO, 0.5V % NO, 0.1V % $C_3H_6$, 0.7V % $H_2$, and 10.0V % $CO_2$, with stoichiometric or above stoichiometric amount of oxygen, moisture, $SO_2$, and remainder being nitrogen. The feed gas was passed over each sample catalyst in a small reactor at space velocity of 40,000 hr$^{-1}$. The test results are shown in Tables 2 and 3 below for the commercial catalyst (WGIT) containing Pt/Rh/$Al_2O_3$—$La_2O_3$—$C_eO_2$ and the composite catalyst (CM4T) containing Pt/Rh/YSZ—$Al_2O_3$, respectively.

TABLE 2

| Test Results for Commercial Catalyst WGIT | | | | |
| --- | --- | --- | --- | --- |
| Inlet Gas Temp. °C. | Oxygen Conc.* | CO Conv., V % | NO Conv., V % | HC** Conv., V % | $H_2$ Conv., V % |
| 230 | Ab. st. | 0.0 | 0.0 | 0.0 | 0.0 |
| 260 | Ab. st. | 6.0 | 20 | 6.0 | 11 |
| 290 | Ab. st. | 92 | 100 | 95 | 100 |
| 320 | St. | 97 | 100 | 100 | 100 |
| 320 | Ab. st. | 98.5 | 55 | 100 | 100 |

*St. = Stoichiometric Ab. st. = Above stoichiometric
**HC = Propylene.

These results in Table 2 show that gas pollutant conversion reactions commence at about 260° C. gas temperature and are substantially complete at 320° C. temperature.

TABLE 3

| Test Results for Composite Catalyst CM4T | | | | |
| --- | --- | --- | --- | --- |
| Inlet Gas Temp. °C. | Oxygen Conc.* | CO Conv., V % | NO Conv., V % | HC** Conv., V % | $H_2$ Conv., V % |
| 160 | St. | 0.0 | 0.0 | 0.0 | 0.0 |
| 170 | At. st. | 1.0 | 18 | 1.0 | 7 |
| 203 | Ab. st. | 79 | 98 | 71 | 100 |
| 223 | Ab. st. | 99 | 98 | 100 | 100 |

TABLE 3-continued

Test Results for Composite Catalyst CM4T

| Inlet Gas Temp. °C. | Oxygen Conc.* | CO Conv., V % | NO Conv., V % | HC** Conv., V % | H₂ Conv., V % |
|---|---|---|---|---|---|
| 265 | Ab. st. | 99 | 100 | 100 | 100 |

*St. = Stoichiometric Ab. st. = Above stoichiometric
**HC = Propylene.

Results in Table 3 show that gas pollutant conversion reactions start at lower temperatures of about 170° C. gas temperature and are substantially complete at 223° C. temperature.

Comparison of these test results in Tables 2 and 3 show that for the catalyst CM4T utilizing a composite support according to this invention, conversions start and are completed at gas temperatures at least about 80° C. lower than those for the commercial WG1T catalyst. Thus, it is considered that the composite Pt/Rh/YS-Z—Al₂O₃ catalyst outperforms a similar commercial catalyst using conventional support by a significant margin, as equivalent conversions of pollutants are achieved at much lower reaction temperatures.

Although this invention has been disclosed broadly and in terms of preferred embodiments and compositions, it will be understood that modifications and variations can be made within the scope of the invention as defined by the following claims.

We claim:

1. A three-way supported precious metal catalyst for treatment of fuel combustion gas emissions from mobile or stationary sources, the catalyst comprising: an oxygen-ion conducting support material provided by a composite of zirconia stabilized by addition of yttria, calcia, magnesia or scandia, and including at least about 40 wt. % inert catalyst support material, said composite support material having surface area at least about 20 m²/gm after thermal aging in air at 1000° C. for four hours; and at least two active metals consisting of a major metal platinum (Pt), palladium (Pd), or a combination thereof, combined with a minor metal consisting of rhodium (Rd), ruthenium (Ru), or a combination thereof, all dispersed on said composite support material in total active metals content between about 0.01 and 3.0 wt. % of the catalyst.

2. The catalyst of claim 1, wherein the amount of zirconia (ZrO₂) in the composite support material is 4.5-45 wt. % of the support.

3. The catalyst of claim 1, wherein the amount of yttria (Y₂O₃) in the composite support material is in the range of 0.5-15 wt. % of the support.

4. The catalyst of claim 1, wherein the amount of the inert support material is 40-95 wt. % of the support.

5. The catalyst of claim 1, wherein the oxygen-ion conducting composite support material is 5-60 wt. % yttria-stabilized-zirconia (YSZ), with the inert support material being 40-95 wt. % alumina.

6. The catalyst of claim 5, wherein the amount of zirconia (Z₂O₂) is 4.5-45 wt. % and the amount of yttria (Y₂O₃) in the composite support material is in the range of 0.5-15 wt. % of the support.

7. The catalyst of claim 1, wherein up to 20 wt. % cerium oxide and/or lanthanum oxide is added to the inert support material of the catalyst to act as an additional thermal stabilizer.

8. The catalyst of claim 1, wherein the composite support material has a surface area of 40-300 m²/gm after said thermal aging.

9. The catalyst of claim 1, wherein the total concentration of the active metals platinum (Pt) and rhodium (Rh) is in the range of 0.01 to 3.0 wt. %, and the weight ratio of rhodium/platinum (Rh/Pt) is in the range of 0.01/1 to 0.5/1.

10. The catalyst of claim 1, wherein the total concentration of active major and minor metals is 0.05-2.5 wt. % of the catalyst, and the weight ratio of minor/major active metals is 0.05/1-0.4/1.

11. A three-way supported precious metal catalyst for conversion removal of fuel combustion gas pollutants from mobile or stationary sources, the catalyst comprising: an oxygen-ion conducting support material provided by a composite of 4.5-45 wt. % zirconia (ZrO₂) stabilized by 0.5-15 wt. % yttria (Y₂O₃), and 40-95 wt. % alumina, said composite support material having surface area of 40-300 m²/gm after thermal aging in air at 1000° C. for four hours; and two active metals consisting of either platinum and rhodium or palladium and rhodium dispersed on the composite support material in total amount of 0.01 to 3.0 wt. % of the catalyst.

12. A method for preparing high surface area yttria-stabilized-zirconia-alumina composite powder useful as catalyst support materials and using a sol-gel technique, comprising:
(a) providing separate solutions of yttrium-alkoxide in a hydrocarbon solvent, zirconium-alkoxide in a hydrocarbon solvent, and aluminum alkoxide in a hydrocarbon solvent; mixing desired amounts of said solutions together at ambient temperature, and stirring the mixture thoroughly;
(b) adding sufficient anhydrous alcohol to said mixed solution to provide less than 10 wt. % salt in the solution;
(c) heating the mixed solution to 25°-100° C. temperature while maintaining a flow of water-saturated air above the solution for 5-50 hours to provide reactant water for hydrolysis reaction to form suspended composite particles;
(d) adding deionized water to said heated solution to maintain a low concentration of water in the solution during further stirring to complete hydrolysis reactions;
(e) evaporating the resulting slurry mixture to recover the powder, and drying the powder;
(f) calcining the dried powder at 500°-1000° C. temperature, so as to produce a powder support material having high thermal stability and surface area at least 40 m²/gm.

13. The method of claim 12, wherein the calcined composite powder mixture contains 0.5-15 wt. % yttria (Y₂O₃), 4.5-45 wt. % zirconia (ZrO₂), and 40-95 wt. % alumina (Al₂O₃).

14. The method of claim 12, wherein the calcined composite powder has surface area of 40-300 m²/gm.

15. The method of claim 12, including impregnating the composite powder with active metals platinum and rhodium for a total active metals content in the range of 0.01-3.0 wt. % of the catalyst, the metals having rhodium/platinum weight ratio of 0.01 to 0.5.

16. The method of claim 12, including impregnating the composite powder with active metals palladium and rhodium for a total active metals content in the range of 0.01-3.0 wt. % of the catalyst, and having rhodium/palladium weight ratio of 0.01-0.5.

17. A method for preparing high surface area yttria-stabilized-zirconia-alumina composite powder using a microemulsion procedure, comprising:
(a) dissolving desired stoichiometric amounts of yttrium chloride, zirconium oxychloride and aluminum chloride in distilled water to form a salt solution;
(b) mixing said salt solution with appropriate amounts of a hydrocarbon solvent, and a surfactant to form a microemulsion;
(c) mixing together a hydrocarbon solvent, a surfactant and concentrated ammonium hydroxide solutions to form a basic microemulsion;
(d) mixing the salt microemulsion from step (b) and basic microemulsion from step (c) to yield a precipitate; and
(e) separating the precipitate from the liquid, then drying and calcining the precipitate to yield a YSZ-$Al_2O_3$ composite powder having high surface area exceeding 40 $m^2$/gm after thermal aging in air at 1000° C. for 4 hours.

18. The method of claim 17, including impregnating the calcined composite powder with active metal platinum and rhodium for a total active metals content in the range of 0.01–3.0 wt. % total active metals and having rhodium/platinum weight ratio in the range of 0.01/1 to 0.5/1.

19. The method of claim 17, including impregnating the calcined composite powder with active metals palladium and rhodium for a total active metals content in the range of 0.01–3.0 wt. % of the catalyst, and having a rhodium/palladium weight ratio of 0.01–0.5/1.

* * * * *